United States Patent [19]
Burns

[11] Patent Number: 5,257,775
[45] Date of Patent: Nov. 2, 1993

[54] JIGS FOR INSTALLING RECESSED LIGHT FIXTURES, CEILING FANS, CEILING HEATERS OR COMBINATIONS

[76] Inventor: John Burns, 510 Lombard St., San Francisco, Calif. 94133

[21] Appl. No.: 896,102

[22] Filed: Jun. 8, 1992

[51] Int. Cl.$^5$ .............................................. B25B 5/00
[52] U.S. Cl. ........................... 269/41; 269/287; 269/289 R; 269/102; 269/904
[58] Field of Search ............. 269/904, 910, 41, 43, 269/102, 287, 289 R; 33/613, DIG. 10

[56] References Cited

U.S. PATENT DOCUMENTS

| | | | |
|---|---|---|---|
| 3,116,563 | 1/1964 | Gelbman | 33/DIG. 10 |
| 3,163,909 | 1/1965 | Williams | 269/904 |
| 4,261,544 | 4/1981 | Addison | 269/287 |
| 4,589,211 | 5/1986 | Policka | 33/DIG. 10 |
| 4,793,069 | 12/1988 | McDowell | 33/DIG. 10 |
| 4,991,807 | 2/1991 | Radnich | 269/287 |
| 5,031,886 | 7/1991 | Sosebee | 269/910 |

*Primary Examiner*—Robert C. Watson

[57] ABSTRACT

Jigs comprising rectangular plates (30, 50, and 60) have centrally positioned concentric recesses and/or holes (37, 39, 51, 53, 61, and 62) for accepting the lip (40) of recessed light fixtures, ceiling fans, and heaters during installation between adjacent ceiling joists. Jigs are attached to joists by screws passing through slots (33 and 65) which enable jigs to be adjusted side-to-side for exact position. Jigs have graduated scale (41) along edges for visual reference and correct positioning of fixture and centrally aligned slots (47) for attaching tape ruler when measuring to another fixture position. A rabbet (45) along one end allows jigs to be used as right-angle square for scribing adjacent joist. A handle (42) provides a balanced position for holding jig while attaching to joists. The jigs make it possible to wire multiple fixtures before installation. A fourth embodiment jig is spaced 0.5" below joists by spacers (72) and has concentric markings and parallel lines for positioning fixtures thereon. Jig has four dogs in radial slots for anchoring fixtures while hanger bars are permanently attached.

14 Claims, 11 Drawing Sheets

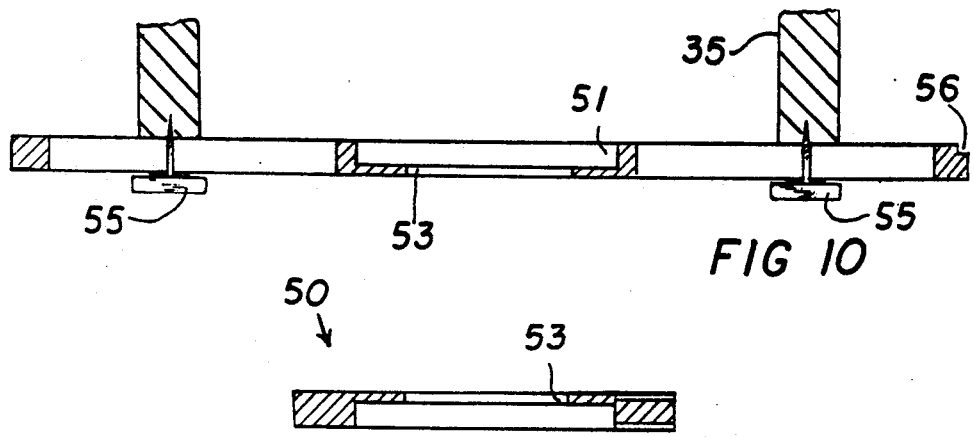
FIG 10
FIG 11
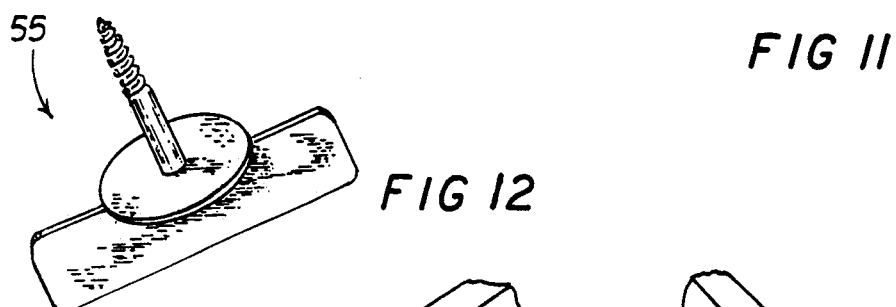
FIG 12
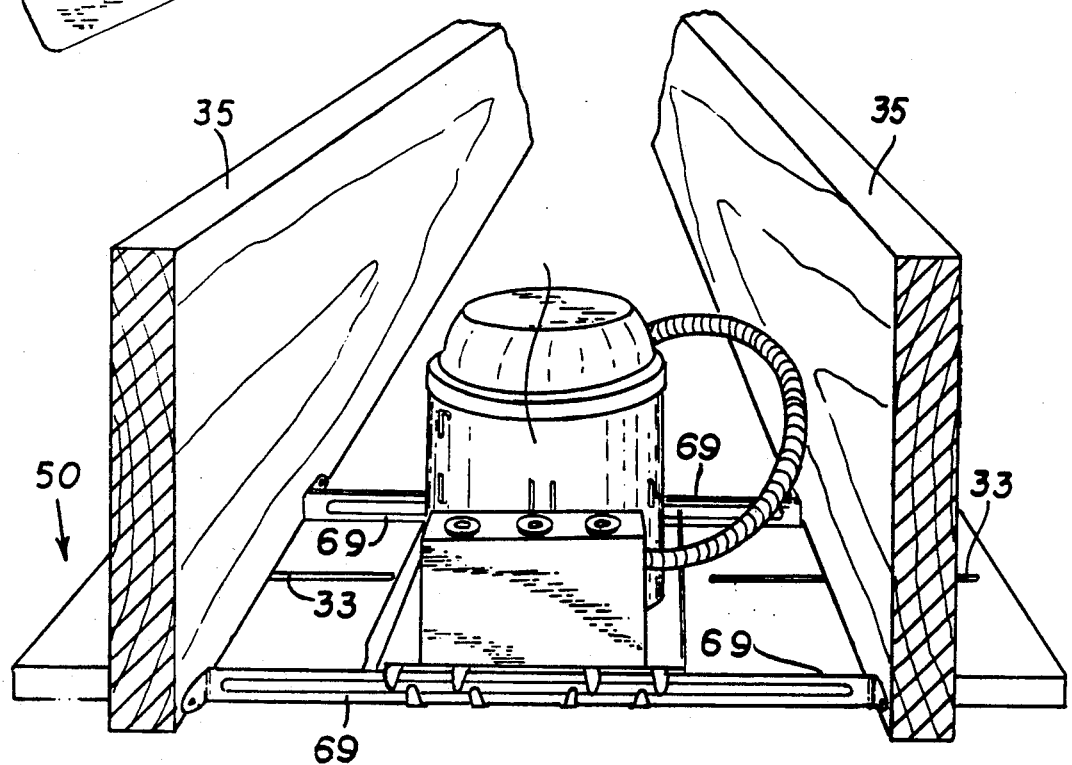
FIG 13

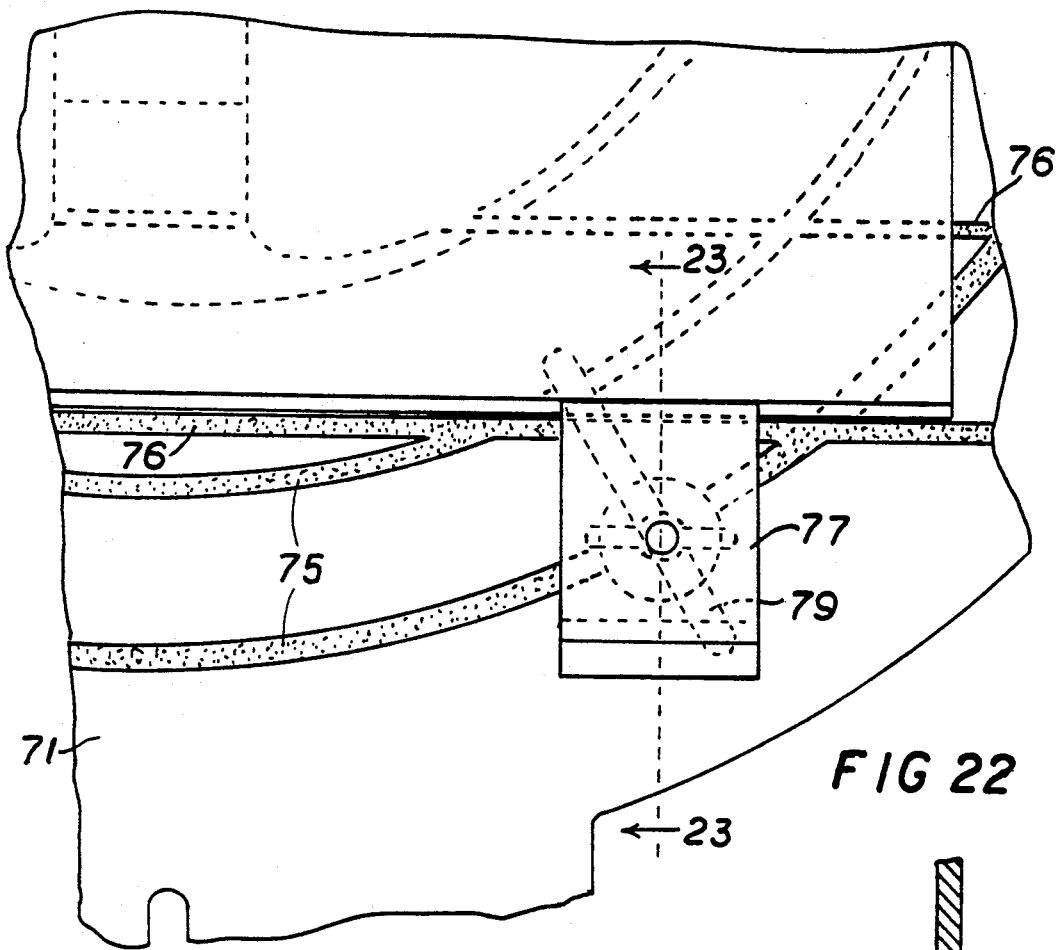
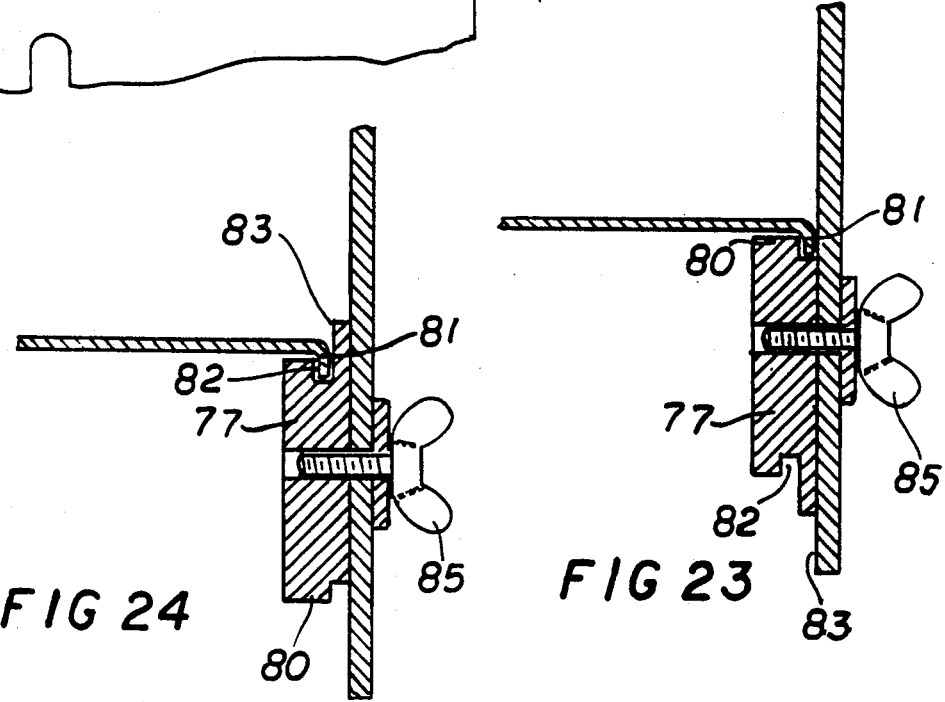

JIGS FOR INSTALLING RECESSED LIGHT FIXTURES, CEILING FANS, CEILING HEATERS OR COMBINATIONS

BACKGROUND—FIELD OF INVENTION

The present invention relates to an electrician's tools, in particular to jigs for aligning, safe handling, and installing of recessed light fixtures, recessed ceiling fans, recessed ceiling heaters, or combinations of two or more of these.

BACKGROUND—DESCRIPTION OF PRIOR-ART

In the past, recessed light fixtures were held in position by hand, while the electrician attempted to attach the hanger bars to the ceiling joists.

Placing the fixtures by hand ran into many complications. For one, the vertical position of the fixture must be such that the recess shoulder will be level with the lower edge of the ceiling joists and the lip of the fixture will project downward into the ceiling sheetrock about 10 mm (0.375") when the sheetrock is attached at a later time. For another, the light fixture has to be positioned with respect to the blueprint instructions. Sometimes the blueprint requires the fixture to be centered between the joists, while at other times it is to be closer to one joist than the other. If the blueprint shows that a light fixture is to be installed where a joist exists, then a portion of the joist has to be removed and short cross joists installed between the joists on either side, the light fixture then being positioned between the cross joists.

Further complications exist when two or more light fixtures are to be installed in the same room. The electrician first measures the correct distance from the wall for the first light position, then drives in a nail and attaches the end of a chalk line. He or she then measures the same distance from the wall to the last fixture position, then holds the line tautly between the two positions and flicks a chalk line across all joists between both measure marks.

For the first installation, the electrician holds a light fixture in place on the center line and at the correct distance from each of the two joists with one hand, while hammering the tabs on the hanger bars into the joist with the other. If, after checking, he finds the fixture is too low or too high, he must pull the hanger bars out and make another attempt to locate the fixture in the correct position. This work can be very awkward and frustrating, as the electrician is working from a position near the top of a ladder and in a restricted area.

Frequently, a knot is found in the joist where a tab or screw is to be inserted, which necessitates having to drill a hole to insert the screw. The electrician must then mark the appropriate spot accurately, remove the light fixture, drill the hole, and reposition the light fixture. Because the task of fixing recessed fixtures is so complicated, several attempts often have to be made before a satisfactory result is achieved and the electrician can proceed to wire the lights—prewiring not being possible, since one person could not set up the installation of more than one fixture at a time.

Electricians are sometimes required to install recessed exhaust fans and recessed ceiling heaters, as well as fixtures combining either or both of these with lights. Such fixtures can be so heavy that they may need to be taken apart and installed piecemeal, a time-consuming and expensive process.

When installing multiple fixtures in the same joist space, measurements to the next fixture are taken from the rim of the preceding fixture. This rim is in the middle of the joist space and the measurement has to be made on a diagonal line to the side of the joist where a mark is made for installing the next fixture. Since this process tends to produce an inaccurate measurement, the electrician is forced to make an approximate "eyeball measurement," which is often faulty, resulting in the need for several attempts to fit the fixture.

It is helpful for an electrician to have an assistant. In that case, one holds the fixture or fixtures in place while the other attends to aligning, vertical placement, and the attachment of the hanger bars to the joists. However, since assistants must be paid, electricians usually work alone.

OBJECTS AND ADVANTAGES

Several objects and advantages of the present invention are 1) to provide a means by which a light fixture can be aligned exactly in position with respect to the lower edge of ceiling joists; 2) to provide a means by which the fixture can be supported without being hand held; 3) to a provide means by which a fixture can be moved side-to-side until a correct position is achieved; 4) to provide a means by which a fixture can by held in the correct position while the electrician attaches the hanger bars with screws; and 5) to provide a means to support the fixture while drilling a hole at a place where there is a knot. Other objects and advantages are 6) to make it unnecessary to have an assistant even when installing large and heavy recessed light and/or other fixtures, and 7) to provide a means for attaching the tab of a tape ruler, thus enabling the user to obtain accurate measurements along a joist.

Still further objects and advantages are 8) to provide a means to accommodate at least two different sizes of fixtures, and 9) to provide a way for an electrician to install six to eight fixtures in the time it previously took to install two or three.

Further objects and advantages are 10) to provide a device which can be used as a right-angle square for marking adjacent joists; 11) to provide a device which allows for the installation of any number of fixtures in perfect alignment; 12) to provide a means by which a plurality of fixtures can be pre-wired on a floor-mounted workbench or any large, flat surface, using pre-cut lengths of wire; and 13) to provide a means by which a plurality of pre-wired fixtures can be quickly installed in a straight row along the same joist space, such as in a hallway. Yet another object and advantage is 14) to provide a means by which accurate measurements can be taken exactly in line with the center of the fixture. Yet another object and advantage is 15) to provide a means for achieving the aforementioned objects and advantages in an easy and inexpensive manner.

Further objects, purposes and advantages, will become apparent from a consideration of the ensuing description, taken in conjunction with the accompanying drawings.

BRIEF DESCRIPTION OF DRAWINGS

FIG. 10 is a sectional view taken along the line 10—10 of FIG. 8.

FIG. 11 is a sectional view taken along the line of 11—11 of FIG. 9.

FIG. 12 is a perspective view of a second form of screw used to attach a jig to ceiling joists.

FIG. 13 is an elevated view of the jig supporting a light fixture between adjacent joists.

FIG. 22 is a fragmented top view of the jig of FIG. 19.

FIG. 23 is a sectional view taken along the line of 23—23 of FIG. 22.

FIG. 24 is the same view as shown in FIG. 23, except that the dog has been reversed.

DETAILED DESCRIPTION OF THE PREFERRED EMBODIMENT—FIGS. 1-6

As described above, recessed light fixtures are fitted between adjacent ceiling joists and above the ceiling sheetrock. The shoulder of the recess is positioned level with the lower edge of the joists. In this position the lip of the fixture will be projecting downward about 10 mm (0.375"). When the sheetrock is fitted at a later date, a hole will be cut in the sheetrock to fit around the lip of the fixture. The fixtures are attached by hanger bars which individually slide sideways to the joists. Each of four hanger bars has a sharpened tab at its distal end for hammering into the joist for the purpose of temporarily holding the fixture in position until it is securely attached by screws.

Working from the top of a ladder in the restricted space between the ceiling joists, the electrician must attempt to hold a light fixture with one hand, align its base with both joists (one on either side), keep it on center line, move the hanger bars into contact with the joists, and hammer the holding tabs into the two joists on the front and rear of the fixture, to secure the fixture temporarily in place.

Frequently, using prior art methods, the fixture proves to have been mounted too high or too low, so that the tabs have to be pulled out and hammered in again in a corrected position, using trial and error until the fixture is correctly placed. The present invention provides an easy method of installing all types of recessed light and recessed fan fixtures while bypassing this trial-and-error method.

Figure 1:
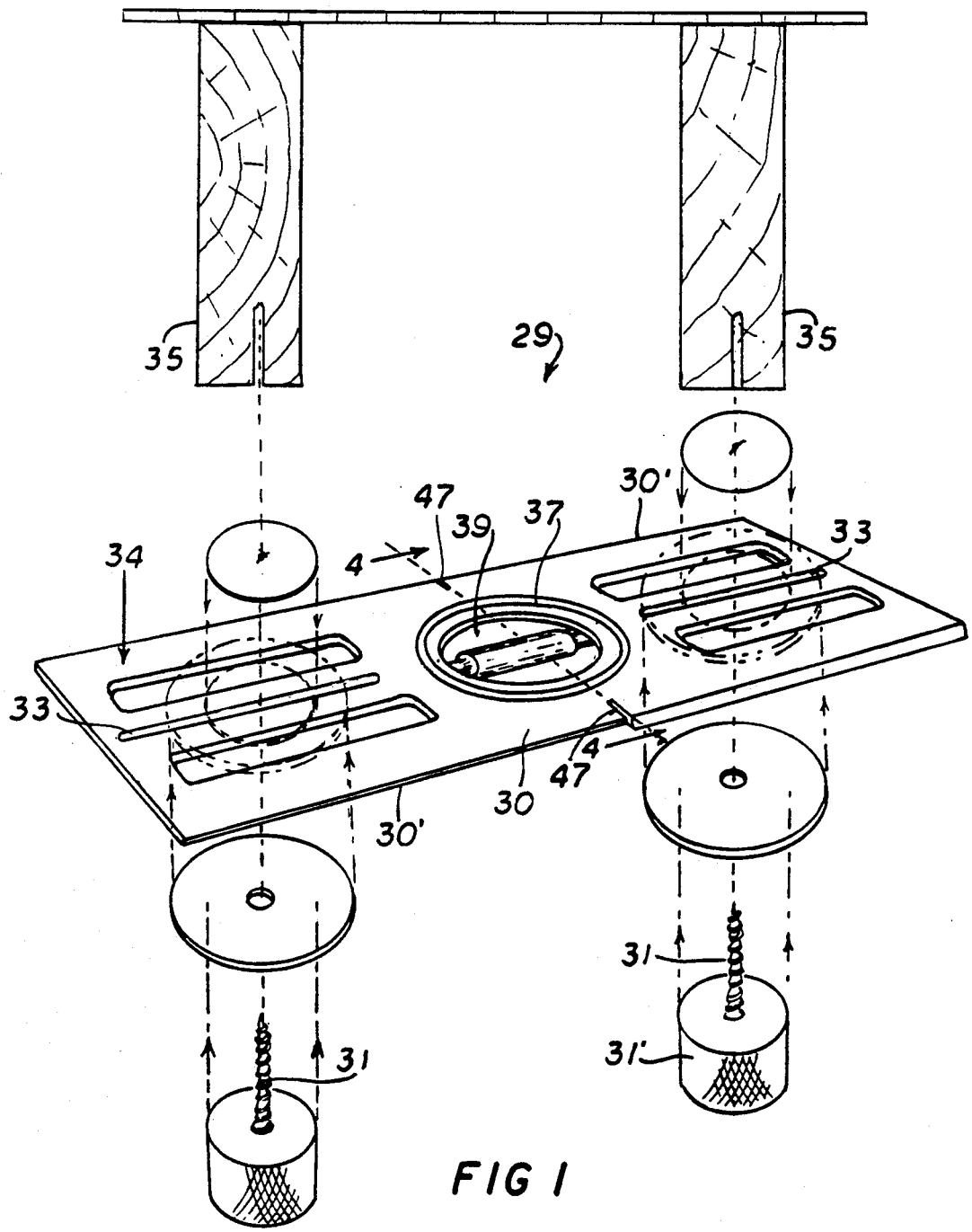
FIG. 1 is an exploded perspective view of a jig being installed under adjacent ceiling joists, according to the invention.
Figure 2:
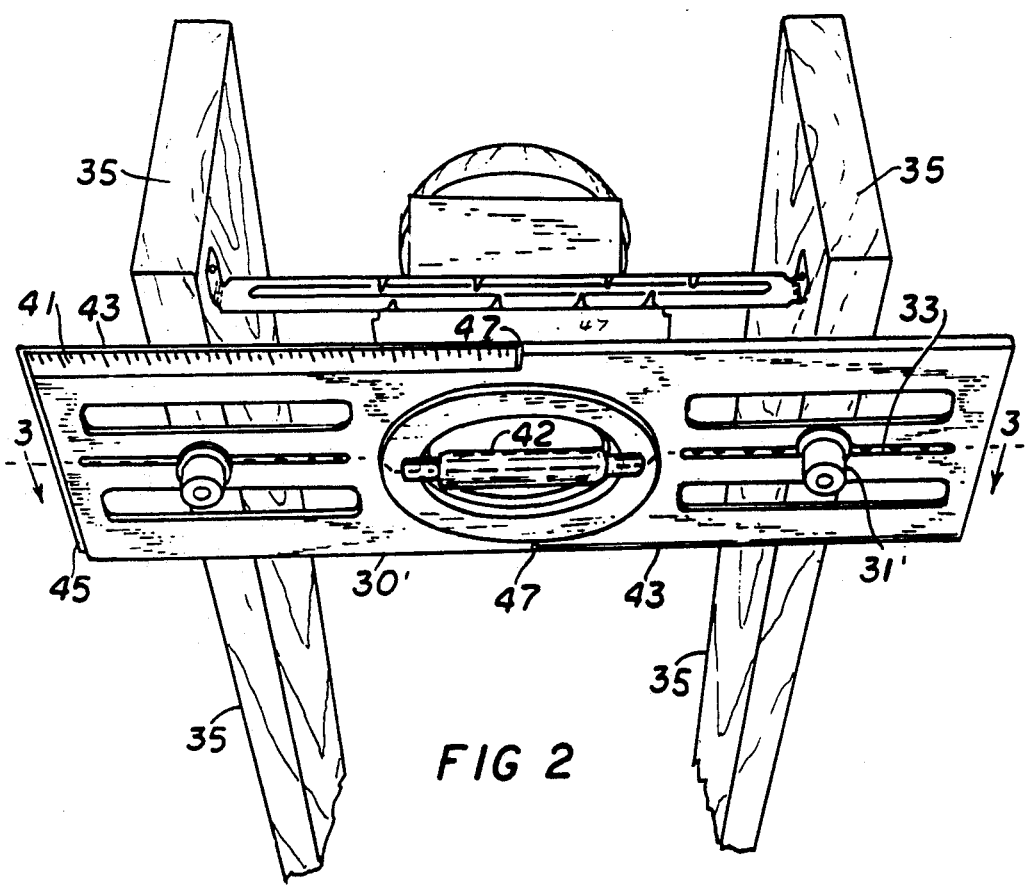
FIG. 2 is a bottom perspective view of the jig installed under adjacent ceiling joists and supporting a light fixture.
Figure 3:
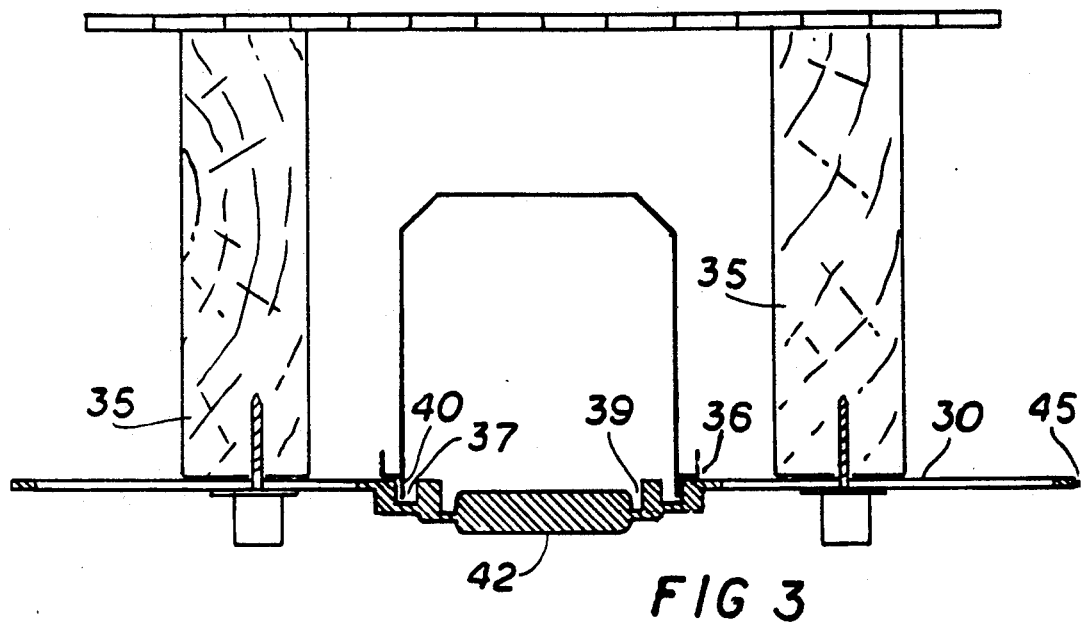
FIG. 3 is a sectioned view taken along the line 3—3 of FIG. 2.

FIGS. 1-3 shows a jig 29, made of aluminum or magnesium alloy and comprising a flat plate 30, having two side edges 30' about 61 cm (24") long and 9.625 (9.625") wide, and 6 mm (0.25") thick. In the center of flat plate 29, the metal is increased in thickness to about 19 mm (0.75"). In use, jig 29 is attached by jig-mounting screws 31, which pass through slots 33 and into two adjacent ceiling joists 35. The top side 34 has a centrally located annular groove 37, 17 mm (6.5") diameter, 13 mm deep and 10 mm (0.375") wide and a circular recess 39 which is 11 cm (4.25") in diameter. Annular groove 37 and circular recess 39 provide a cavity into which lip 40 of a 6" or 4" light fixture extends, during installation, (FIG. 3). At the same time shoulder 36 rests on flat plate 30.

Figures 5, 6:
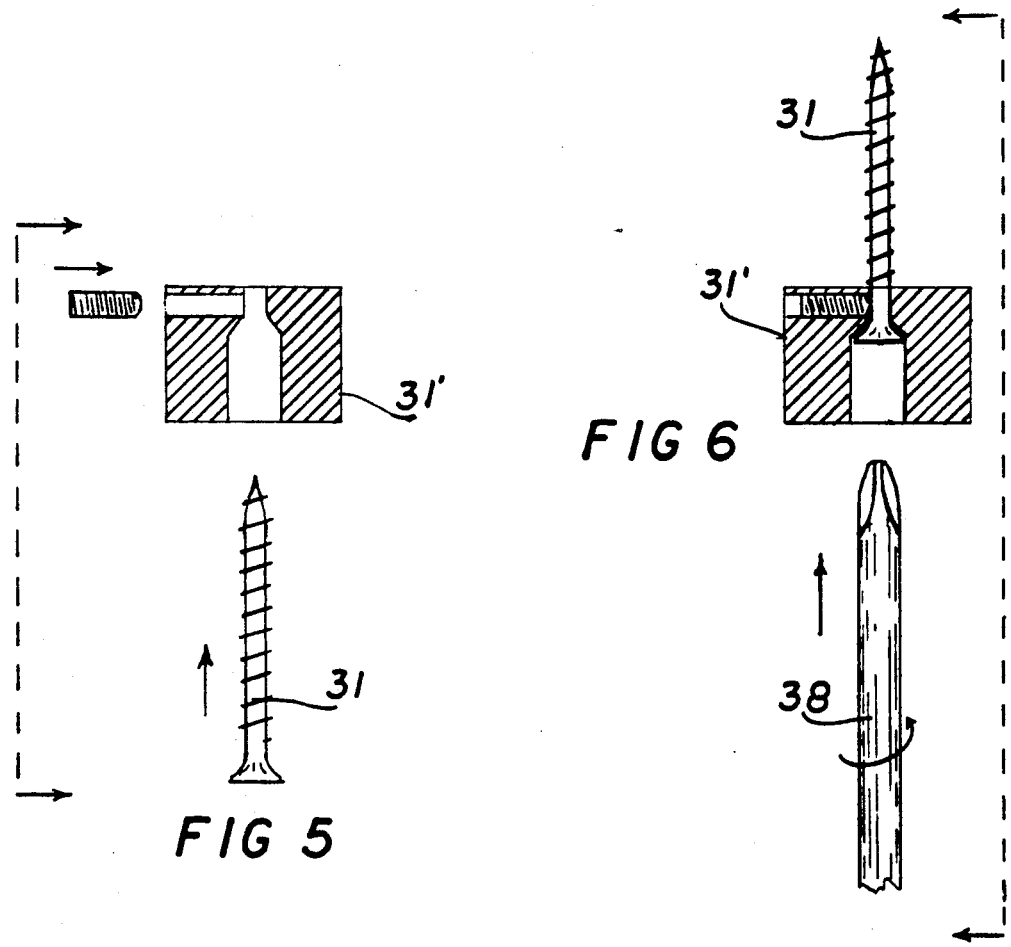
FIG. 5 is part-exploded, part-sectioned view of a screw and knob used to attach the invention to ceiling joists.
FIG. 6 is a sectional view of the screw of FIG. 5 when assembled.
Figure 4:
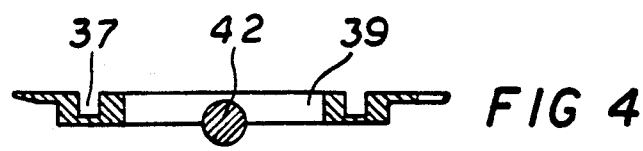
FIG. 4 is a sectional view taken along the line 4—4 of FIG. 1

A graduated scale 41 (FIG. 2) on each side 43, (one only shown) aids positioning the jig with respects to the joists. Scales 41 can be in customary inch or metric measurement or both. A handle 42, (FIGS. 2-4) can be either integrally made or attached separately. In use, it facilitates handling the jig from the underneath side when jig 30 is being attached to ceiling joists 35 by screws 31. Screws 31 are made with a knob 31' for hand starting, and a recess for the insertion of a phillip electric screwdriver 38 for finish driving, (FIG. 6). FIG. 5 shows the method of assembling screw 31.

A rabbet relief 45 is made along one end to facilitate using the jig as a right-angle square. This is done by pressing the rabbet against the lower edge of a joist. Narrow slots 47 are cut about 12 mm (0.5") deep and 2 mm (0.093") wide into sides 30', and are used to attach the tab of a tape ruler when measurements are taken in order to mark a position of another fixture, (FIG. 2)

SECOND EMBODIMENT, WOODEN JIG FOR LIGHT FIXTURES—FIGS. 7-15

Figure 7:
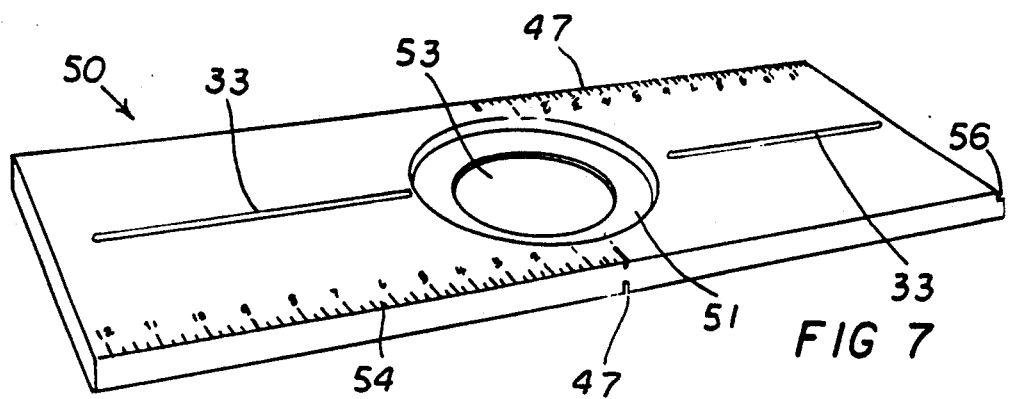
FIG. 7 is a perspective view of a second embodiment according to the invention.
Figure 8:
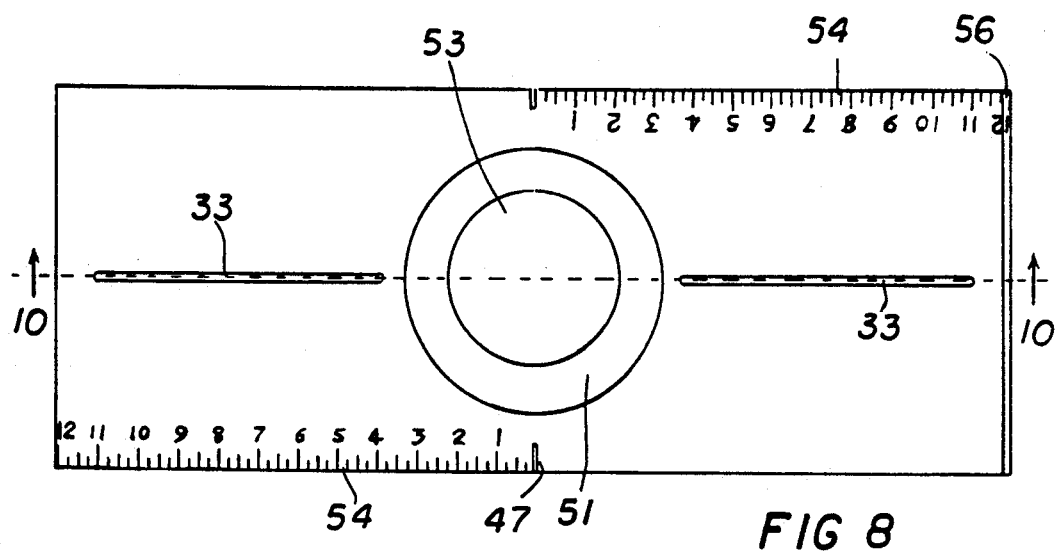
FIG. 8 is a plan view of the second embodiment shown in FIG. 7.
Figure 9:
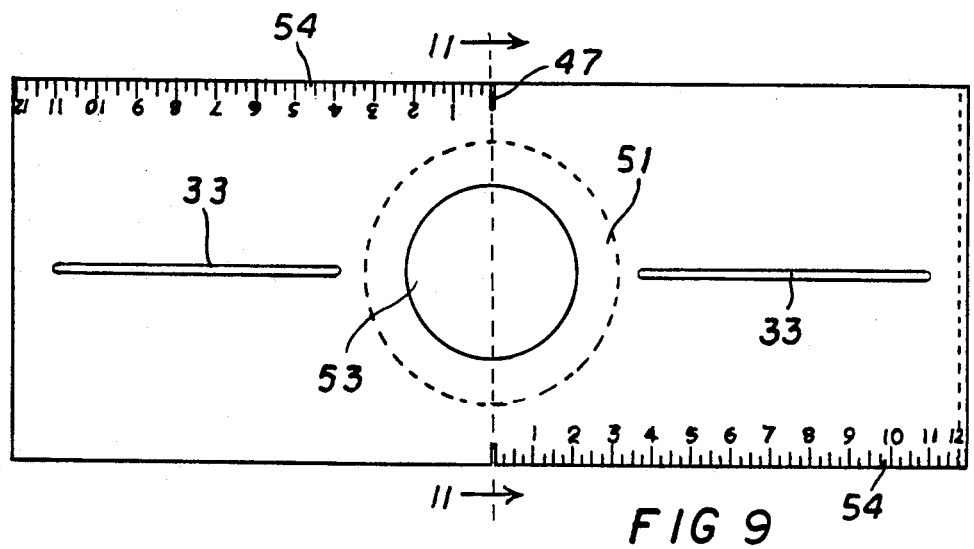
FIG. 9 is a plan view of the reverse side of FIG. 8.

FIGS. 7-9 shows a one-piece plywood jig 50. It is about 61 cm (24") long and 24 cm (9.5") wide, and about 2 cm (0.75") thick. It has an 11 cm (4.25") diameter recess 53 on one side and a 17 cm (6.5") diameter recess 51 cut 13 mm (0.558") deep on the other. Two slots 33 are cut through the jig along a center line as in the metal jig.

Also a rabbet relief 56, 6 mm (0.25") wide and deep is cut along the edge at one end.

Beginning at a point midway along each side edge, a graduated scale 54 is printed in metric and/or customary inch measurements. Starting from 1-30.5 cm and/or (1 to 12"), so arranged that the jig can be turned around and measurements read from either side. This scale is repeated on the reverse side, (FIGS. 9)

FIG. 10 shows a longitudinal cross section, taken along taken along the line 10—10 of FIG. 8.

FIG. 11 is a cross sectional view taken along the line 11—11 of FIG. 9. FIG. 13 shows a 6" light fixture located centrally between two adjacent joists with hanger bars 69 attached to the joists. Jig 50 is held in position against the lower edge of two ceiling joists by two winged screws 55 (FIG. 12). These are an alternative screw to those shown in FIG. 6. A full size perspective view of one such screw is shown in FIG. 12.

FIG. 11 is a cross sectional view taken along the line 11—11 (FIG. 9). When jig 50 is reversed, recess 53 is facing upward for locating a 10 cm (4") light fixture.

FIG. 13 shows an elevated view of jig 50 supporting a (6") light fixture. Independently sliding front and rear hanger bars 69 are shown with the tabs hammered into the joists. Additional screws will be inserted into holes on each front and rear hanger bar ends to make the installation a permanent fixture. Jig 50 can then be removed.

JIG USED AS A RIGHT-ANGLE SQUARE—FIG. 14

Figure 14:
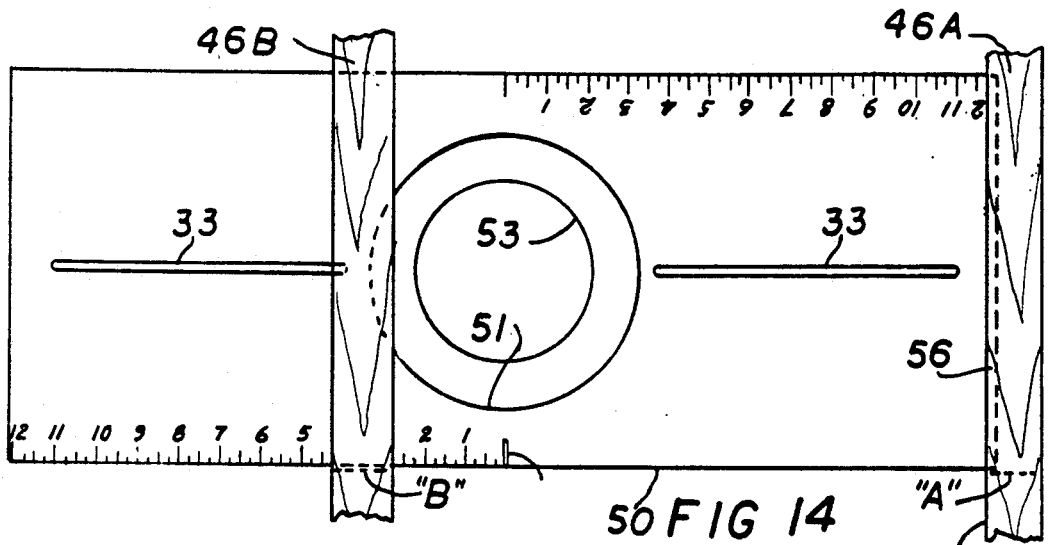
FIG. 14 is a top view of a jig being used as a right angle square.

FIG. 14 shows jig 50 being used as a right-angle square. Rabbet 56 is placed against joist 46A near scribed line "A", then a line "B" is scribed on joist 46B. The center line slot 33 of the jig is then placed over both scribed line "A" and "B" and two screws as shown in FIG. 12 are then inserted.

Figure 15:
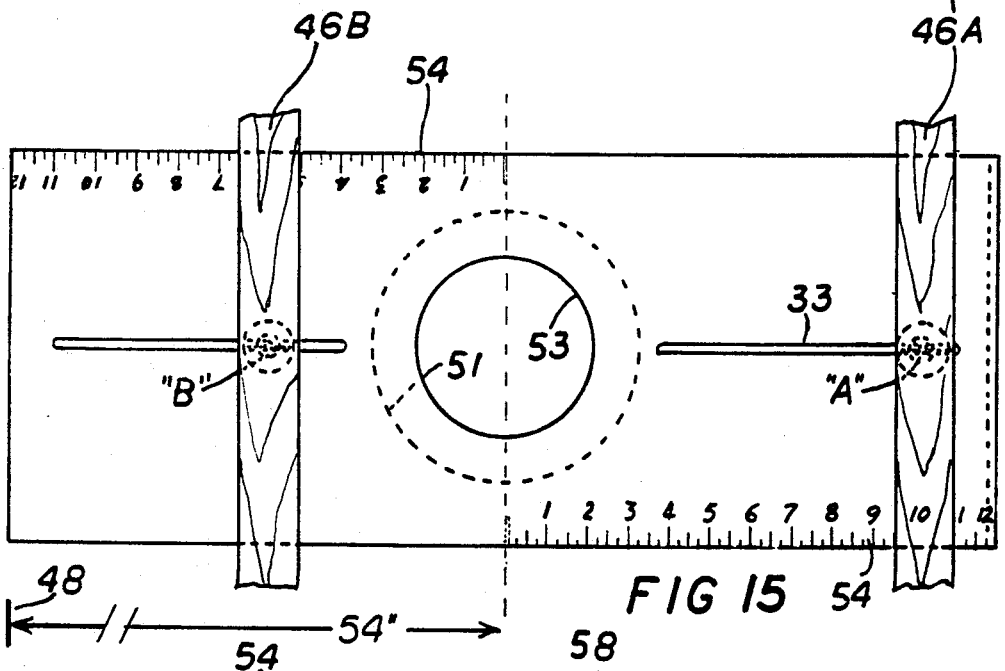
FIG. 15 is a top view of a jig being used to position a light fixture closer to one of the joists.

Occasionally a light fixture is to be placed closer to one joist than the adjacent joist, (FIG. 15). For example, the position for the light shown on the blueprint is 54" from wall 48; the distance is measured from the wall and indicates that the center of the fixture will be 5" from a joist. The jig can be attached as shown in FIG. 15, with the center of the fixture to be placed 5" from the joist, as indicated by the scale 54.

Figure 16:
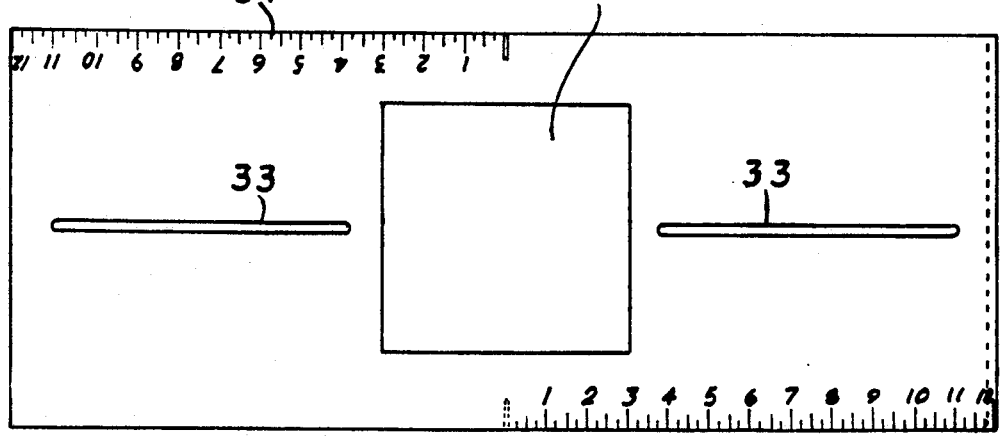
FIG. 16 is a top view of the jig with a square hole for supporting a square light fixture.

FIG. 16 shows a jig with a square hole 58 used for installing square recessed light fixtures.

THIRD EMBODIMENT, FOR LARGE FIXTURES—FIGS. 17 AND 18

Figure 17:
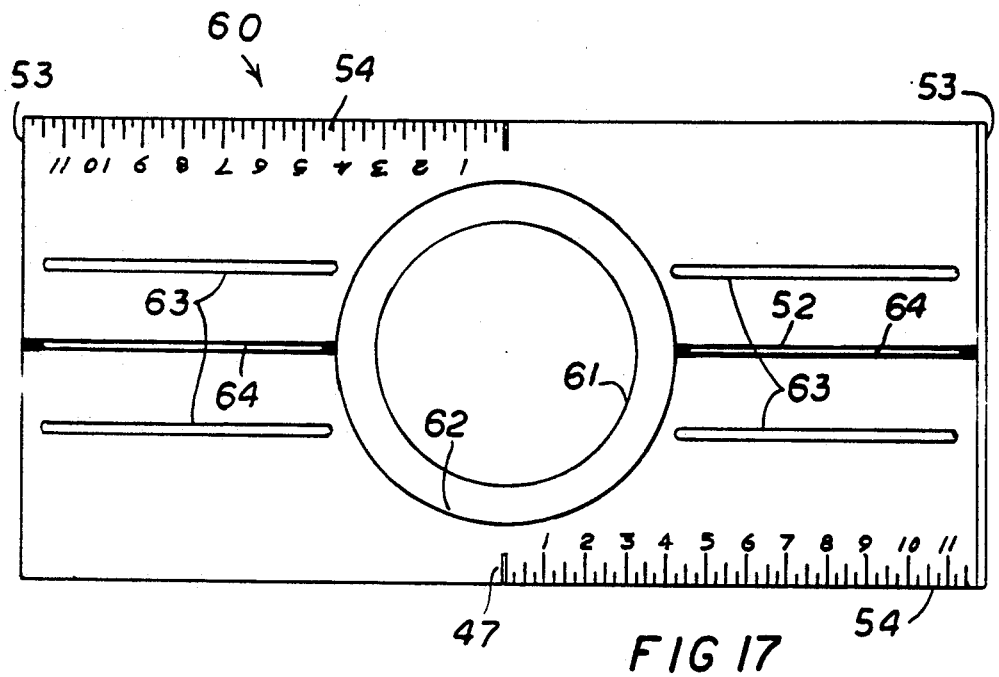
FIG. 17 is a top view of a third embodiment for installing large light fixtures.

FIG. 17 shows a third embodiment comprising a plywood jig 60, 61 cm (24") long, 28.5 cm (11.25) wide, and 2 cm (0.75") thick, having a cut-out recess 61, 16.5 cm (6.5") in diameter on one side and 21.5 cm, (8.5") recess 62, cut 13 mm (0.558") deep on the other.

Two parallel slots 63 are placed 10 cm (4") apart on each side of the center recess. Slots 63 are cut within 12 mm (0.5") of ends 53 of jig 60. Slots 63 are about 177 mm long and 7 mm (0.3") wide. A center line 52 is marked from "end to end" on both sides of jig 60. A narrow groove 64 is cut 6 mm (0.25") deep and 177 mm (7") long and 3 mm (0.125") wide for attaching tape ruler for making accurate measurements from the center of one fixture to the center of another fixture along the joists.

Figure 18:
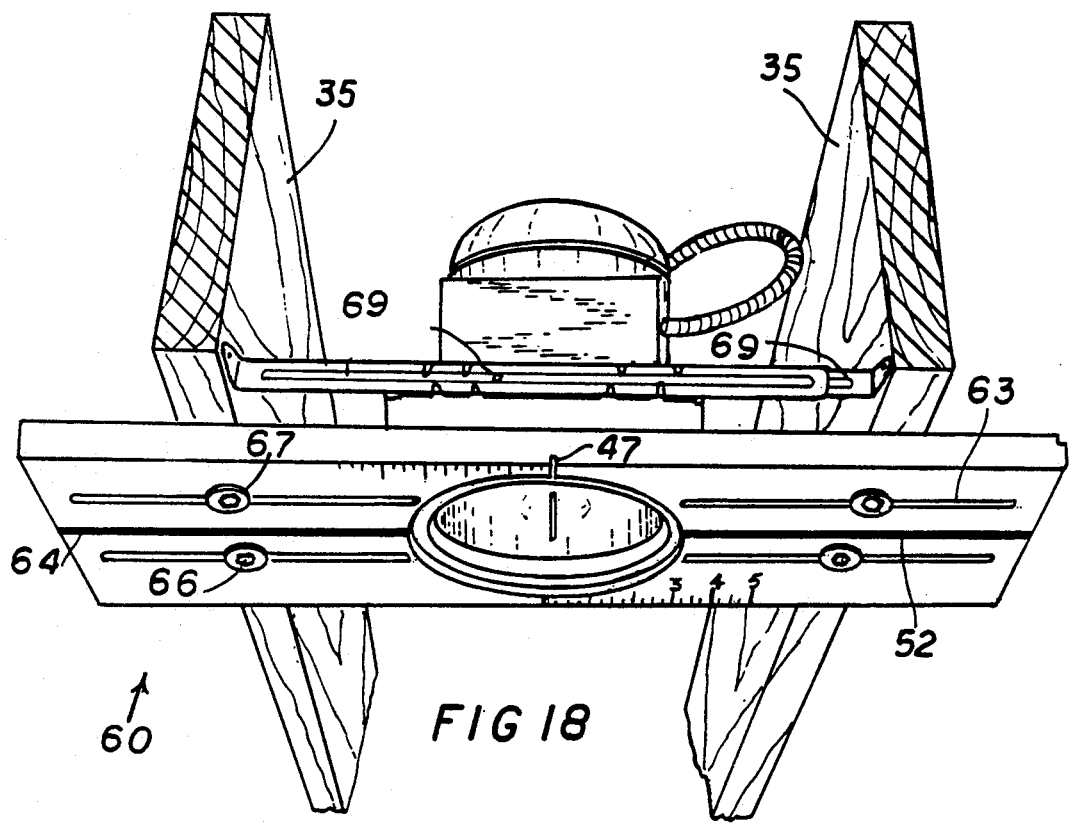
FIG. 18 is a bottom perspective view of the jig of FIG. 17 supporting a heavy light fixture.

FIG. 18, shows a bottom perspective view of jig 60 attached to adjacent joists 35 by No. 12 hex. hd. sheet metal screws 66 inserted through 4 cm (1.5") diameter washers 67.

PREWIRING A PLURALITY OF LIGHT FIXTURES BEFORE INSTALLING

When a plurality of light fixtures are to be installed between two joints, such as down a lengthy hall, they can be pre-wired on any convenient surface, such as a floor or a workbench, using pre-cut lengths of wire.

After the lights are wired, and are ready to be installed, the electrician attaches a suitable jig to the ceiling joists at the first light position. Then the first light fixture is mounted on this jig, and its hanger bars are attached, while the other fixtures are left to dangle, or to be temporarily supported. A second jig is now placed under the second light fixture, lifted up and screwed to the ceiling joists. Then its hanger bars are attached. Each jig provides an extremely stable platform despite the tug exerted by the other fixtures. For reasons of safety, the first jig is temporarily left in place after the first fixture is permanently installed. Then a second jig is employed to mount the second fixture, and temporarily left in place while the first jig is removed and used to install the third fixture, and so on, in a step-over or leap-frog pattern, until the whole row of fixtures has been installed. This process not only saves installation time, it entirely eliminates the troublesome task of having to wire the light fixtures after they have been installed.

FOURTH EMBODIMENT, JIG FOR LARGE, SQUARE, RECTANGULAR, OR ROUND RECESSED LIGHT, FAN OR HEATER FIXTURES—FIGS. 19-25

Figures 19, 20:
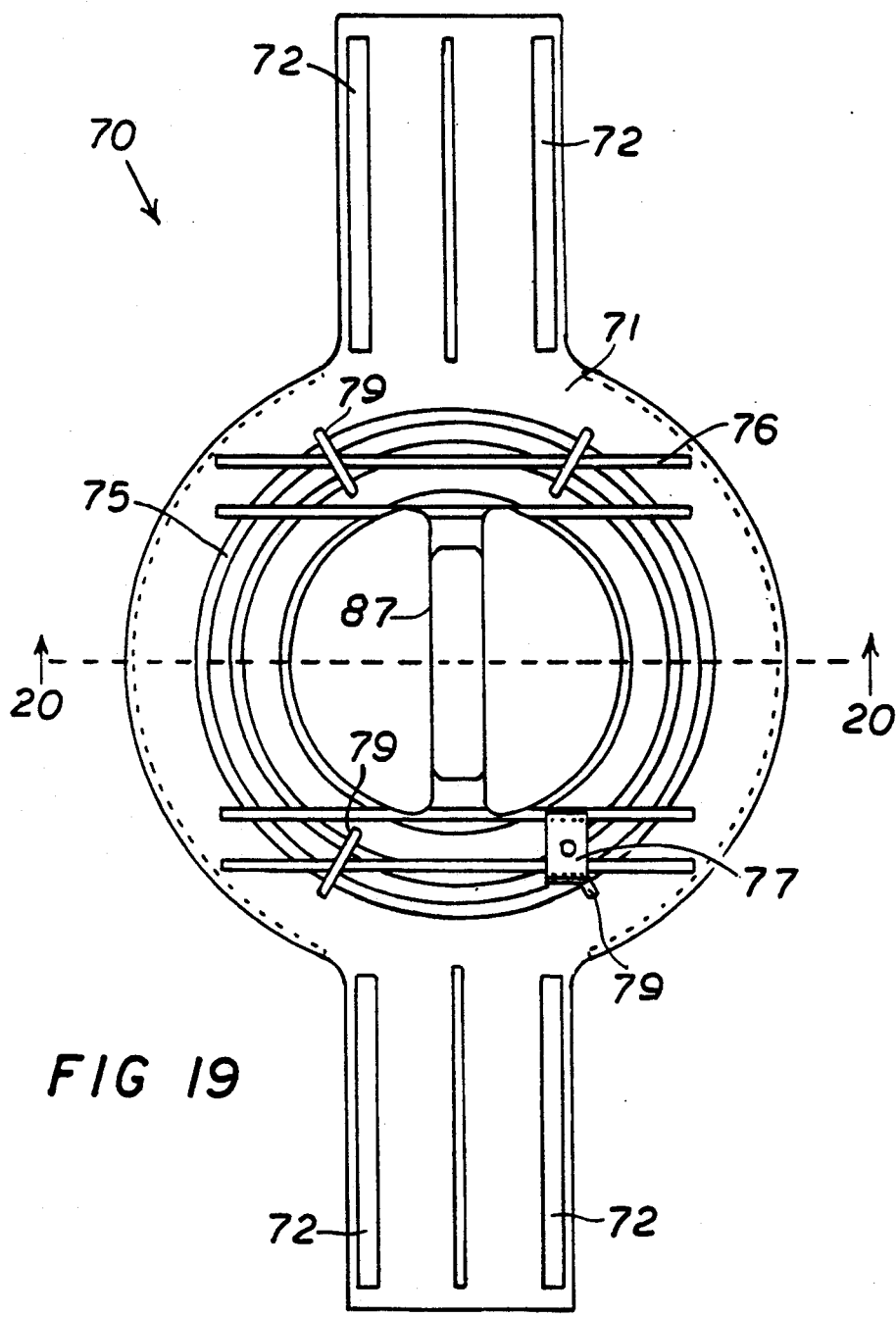
FIG. 19 is a top view of a fourth embodiment for installing round or square recessed exhaust fan and/or recessed heater fixtures.
FIG. 20 is a sectional view taken along the line of 20—20 of FIG. 19.
Figure 21:
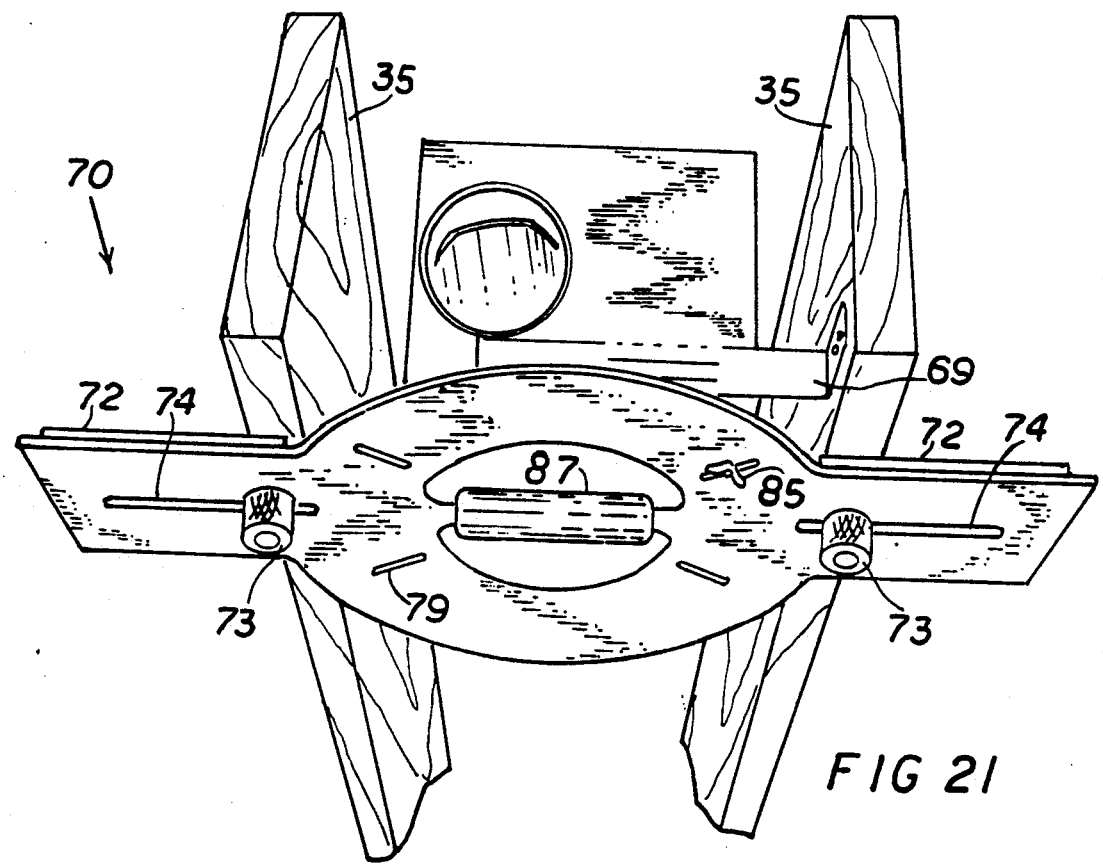
FIG. 21 is a bottom view of the jig supporting an exhaust fan fixture.
Figure 25:
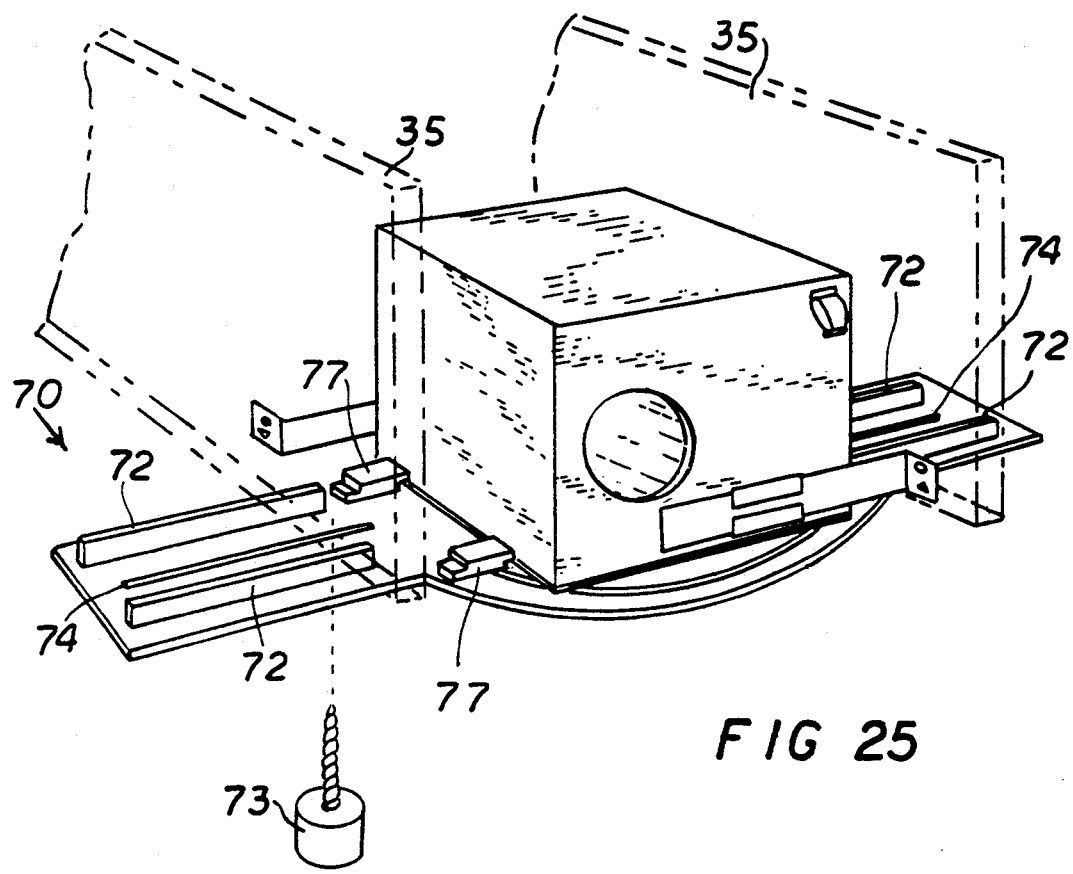
FIG. 25 is an elevated perspective view of the jig shown in FIG. 19 supporting an exhaust fan fixture.

FIG. 19 shows a plan view of jig 70 for large fixtures. It differs from other jigs in that its upper surface 71 is spaced about 12 mm (0.5") below the lower edge of the ceiling joists by metal spacers 72. The jig is mounted by screws 73 fitted through slots 74 which are screwed into two adjacent ceiling joists. It upper surface 71 is imprinted with circular rings 75 and transverse parallel lines 76. In use these are used as guides to position a fixture in a correct position and at a level about 12 mm (0.5") below the level of the joists. Four adjustable dogs 77 (only one shown) which operate in radially positioned slots 79 (FIGS. 19, 22-24) have a projection 80 which extends over flange 81 of the fixture to lock it down against the jig while the hanger bars are attached to the joists.

Some fixtures require a 9 mm (0.375") projection below the joists, therefore require to be raised about 4 mm (0.125") from the 12 mm (0.5") extended position. This is achieved by reversing each dog 77 end-for-end (FIG. 24) so that the fixture sits on platforms 83 and flange 81 is locked in slot 82 when dog 77 is tightened by wingnut 85.

A handle 87 is provided in a centrally balanced position for holding the jig by hand while fitting the jig mounting screws into the joists.

SUMMARY, RAMIFICATIONS AND SCOPE

Thus the reader will see that I have provided a simple jig which overcomes the complicated and troublesome prior-art method of installing recessed light fixtures and which dramatically simplifies the installation. I have provided a jig which automatically positions the light fixture's vertical position exactly level with the lower edge of the ceiling joists, allowing the recessed extension lip to protrude into the ceiling sheetrock the correct amount when the sheetrock is fixed at a later time.

Also, my jig holds the fixture firmly while the hanger bars are attached to the joists and screws inserted; and if knots in the wood are encountered, the fixture can be moved and supported while holes are drilled to accept the anchoring screws. My jig also makes it unnecessary to have an assistant, even when installing large and heavy light fixtures. It can also be used to install either of the two standard sized light fixtures, (6" and 4"). My jig also enables the electrician to install a row of light fixtures in perfect alignment, in a quarter to a third the time hitherto required. Very importantly, the use of two jigs makes it both possible and convenient to pre-wire a plurality of fixtures for installation in a row between two joists (for instance along a hallway), a task previously impossible. Also, center-line slots on the jig provide accurate tape-measure hook-on positions for measuring to other fixture positions either along or across ceiling joists.

The jig is inexpensive to manufacture. Its use reduces the cost of the electrician's work, as well as reducing the chance of accidents by cutting back on the time spent working near the top of ladders.

While the above description contains many specificities, the reader should not construe these as limitations on the scope of the invention but merely as exemplifications of preferred embodiments thereof. Those skilled in the art will envision that many other possible variations are within its scope. For example, skilled artisans will readily be able to change the dimensions and shapes of the various embodiments. Also, other materials, such as aluminum, magnesium, lightweight carbons, plastics, reinforced plastics, fiberglass, presswood products, sheet metal, or combinations of these, can be used to produce the jig. Also, the scales can be imprinted, embossed, or attached. The slots can be made wider or narrower or, as on the third embodiment, spaced further apart or closer together.

It will be understood that the particular embodiments of the invention disclosed herein are for illustrative purposes and for clearness of understanding only and that various changes may be made therein without departing from the scope of the invention.

Accordingly, the reader is requested to determine the scope of the invention by the appended claims and their legal equivalents, and not by the examples which have been given.

I claim:

1. A jig for installing a recessed fixture in a space between two joists, comprising:
   a plate having an upper surface and a lower surface and a first edge and a second edge, said first edge and said second edge being at right angles to one another,
   a positioning means for positioning said fixture with respect to said plate, and
   an attachment means for temporarily affixing said plate to at least one of said joists,
whereby said jig holds said fixture in a preferred position for installation between said joists, and wherein said first edge has a step to engage an edge of one of said joists, such that when said step is held in engagement with said edge of said joist, said second edge is oriented perpendicular to said joists forming a guide for scribing an alignment mark on said joists.

2. A jig for installing a recessed fixture in a space between two joists, comprising:
   a plate having an upper surface and a lower surface,
   a handle attached to said lower surface for holding said jig in position to facilitate the attachment of said jig to said joists,
   a positioning means for positioning said fixture with respect to said plate, comprising a recess in said upper surface of said plate for accepting and holding said fixture, and
   an attachment means for temporarily affixing said plate to at least one of said joists,
whereby said jig holds said fixture in a preferred position for installation between said joists.

3. A jig for installing a recessed fixture in a space between two joists, comprising:
   a plate having an upper surface and a lower surface,
   a positioning means for positioning said fixture with respect to said plate, comprising a recess in said upper surface of said plate for accepting and holding said fixture,
   at least one dog for temporarily fastening said fixture to said plate, and
   an attachment means for temporarily affixing said plate to at least one of said joists,
whereby said jig holds said fixture in a preferred position for installation between said joists.

4. The jig of claim 3 wherein said positioning means comprises a plurality of dogs, said dogs each having a slot therein for retaining a flange of said fixture.

5. The jig of claim 4 wherein said dogs are positioned on said upper surface of said plate, each of said dogs having a shoulder of a given thickness adjacent said upper surface and a slot adjacent said shoulder for retaining a flange of said fixture, whereby said fixture may be held in a position spaced apart from said upper surface of said plate.

6. The jig of claim 5 wherein each of said dogs has a first edge and a second edge, said first edge having a slot adjacent said upper surface for retaining a flange of said fixture against said upper surface, and said second edge having a shoulder of a given thickness adjacent said upper surface and a slot adjacent said shoulder for retaining a flange of said fixture, whereby said fixture may be held in a position spaced apart from said upper surface of said plate.

7. The jig of claim 6 wherein said plate has a plurality of slots there through, and each of said dogs is movably fastened to said plate by means of a bolt which passes through one of said slots.

8. A jig for installing a recessed fixture in a space between two joists, comprising:
   a plate having an upper surface and a lower surface, said plate having at least one spacer bar extending away from said upper surface of said plate for spacing said jig a fixed distance from said joists,
   a positioning means for positioning said fixture with respect to said plate, comprising a recess in said upper surface of said plate for accepting and holding said fixture, and
   an attachment means for temporarily affixing said plate to at least one of said joists,
whereby said jig holds said fixture in a preferred position for installation between said joists.

9. A jig for installing a recessed fixture in a space between two joists, comprising:
   a plate having an upper surface and a lower surface,
   a positioning means for positioning said fixture with respect to said plate, comprising a recess in said upper surface of said plate for accepting and holding said fixture,
   at least one slot in said plate aligned with the center of said positioning means, said slot being adapted to accept for insertion therein the tab end of a tape measure, and
   an attachment means for temporarily affixing said plate to at least one of said joists,
whereby said jig holds said fixture in a preferred position for installation between said joists.

10. A jig for installing a recessed fixture in a space between two joists, comprising:
- a rectangular plate having an upper surface and a lower surface,
- a recess in said upper surface of said plate for accepting and holding said fixture,
- said plate having two parallel edges marked with graduated scales, each of said scales having an origin positioned on a line perpendicular to said parallel edges and passing through the center of said recess, the graduations of said scales extending in opposite directions from said line, said scales serving to facilitate centering of said jig between two of said joists, and
- at least one slot through said plate and at least one jig mounting screw passing through said slot to temporarily affix said plate to at least one of said joists, whereby said jig holds said fixture in a preferred position for installation between said joists.

11. A jig for installing a recessed fixture in a space between two joists, comprising:
- a rectangular plate having an upper surface and a lower surface,
- a circular recess centered upon said upper surface of said rectangular plate for accepting and holding said fixture, and
- at least one slot through said plate and at least one jig mounting screw passing through said slot to temporarily affix said plate to at least one of said joists, whereby said jig holds said fixture in a preferred position for installation between said joists.

12. The jig of claim 11 wherein said circular recess comprises an annular recess centered upon said upper surface of said rectangular plate.

13. A jig for installing a recessed fixture in a space between two joists, comprising:
- a plate having an upper surface and a lower surface, said plate having a circular portion and two opposing rectangular portions, said rectangular portions having at least one spacer bar extending away from said upper surface of said plate for spacing said jig a fixed distance from said joists, said rectangular portions having at least one slot there through and at least one jig mounting screw passing through said slot to temporarily affix said plate to at least one of said joists, and
- said circular portion having at least one slot there through, and at least one dog for temporarily fastening said fixture to said plate, said dog being movably fastened to said plate by means of a bolt which passes through said slot, whereby said jig holds said fixture in a preferred position for installation between said joists.

14. The jig of claim 13 wherein said upper surface of said circular portion has markings which serve as a guide in the positioning of said fixture with respect to said plate.

* * * * *